(12) United States Patent
Takumi et al.

(10) Patent No.: US 7,948,690 B2
(45) Date of Patent: May 24, 2011

(54) COMPOSITE LENS (75) Inventors: Ai Takumi, Osaka (JP); Satoru Ota, Osaka (JP); Yutaka Ueta, Osaka (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 0 days.

(21) Appl. No.: 12/393,268

(22) Filed: Feb. 26, 2009

(65) Prior Publication Data

US 2009/0213476 A1  Aug. 27, 2009

(30) Foreign Application Priority Data

Feb. 26, 2008  (JP) ................. 2008-045210

(51) Int. Cl.
G02B 3/08 (2006.01)
G02B 9/00 (2006.01)

(52) U.S. Cl. ...................... 359/741; 359/796
(58) Field of Classification Search .......... 359/741, 359/793, 796
See application file for complete search history.

(56) References Cited

U.S. PATENT DOCUMENTS

| 3,883,228 | A | 5/1975 | Betensky | |
|---|---|---|---|---|
| 4,662,717 | A | 5/1987 | Yamada et al. | |
| 6,819,508 | B2 * | 11/2004 | Chiang | 359/796 |
| 2009/0244725 | A1 * | 10/2009 | Huang | 359/796 |

FOREIGN PATENT DOCUMENTS

| JP | 2003-025345 A | 1/2003 |
|---|---|---|
| JP | 2003-311757 A | 11/2003 |

* cited by examiner

Primary Examiner — Jack Dinh
(74) Attorney, Agent, or Firm — Westerman, Hattori, Daniels & Adrian, LLP (57) ABSTRACT A composite lens of the present invention has a base lens and a resin lens placed on the base lens. The resin lens has, in an area outside an optically effective diameter, a first surface, a second surface that is adjacent to the first surface, and a third surface that is adjacent to the second surface in sequence from an optical axis to an outer circumference. The first surface has an inclined surface that becomes higher from the outer circumference toward the optical axis, and the inclined surface is connected to the second surface. The second surface has a plane that is substantially perpendicular to the optical axis, and the substantially perpendicular plane is connected to the first plane. The third surface has an inclined surface that becomes lower from an inner circumference toward the outer circumference.

2 Claims, 6 Drawing Sheets

COMPOSITE LENS

BACKGROUND OF THE INVENTION

1. Field of the Invention

The present invention relates to a composite lens having a resin lens provided on a base lens. In particular, the present invention relates to a composite lens having a resin marker that enables easy alignment of a resin when the resin lens is produced on the base lens.

2. Description of the Related Art

An optical device, such as a digital camera and a portable cellular phone, uses various lenses. However, an aberration arises in an image converged by a spherical lens; hence, the image becomes blurred for reasons of the aberration. Methods, such as a method employing a plurality of lenses with different refractive indices, are available for preventing occurrence of an aberration. However, employment of a large number of lenses is contrary to the need for a reduction in the weight of the optical device. Accordingly, a resin lens having an aspheric shape is produced on the surface of the spherical lens, so as to produce a composite lens functioning as an aspheric lens. By employing the composite lens in the optical device, lightweight and compact optical device whose aberration is corrected is put into practical use.

FIG. 4 illustrates a method for manufacturing a related-art composite lens (see Patent Document 1). As shown in FIG. 4A, under the manufacturing method, firstly resin 42a, such as an UV curable resin or a thermosetting resin, is placed on an aspheric transfer surface of a mold 43. Next, an optical axis of a base lens 41, such as a spherical lens, and a center axis of the mold are aligned to each other, and the resin 42a is pressed by the base lens 41, thereby molding the resin 42a in conformance with the aspheric shape of the transfer surface of the mold 43. Subsequently, as shown in FIG. 4B, the resin is hardened upon exposure to UV radiation or heating according to the type of the resin 42a, thereby producing a resin lens 42 on the base lens 41. Thus, a composite lens, such as that shown in FIG. 4C, can be manufactured. For instance, as shown in FIG. 4D, the thus-manufactured composite lens 44 is attached to a camera cone 45 of the optical device, and an objective-side of the composite lens is supported by an annular holder 45a. The opposite side of the composite lens is fastened to the camera cone 45 by bonding or thermal caulking 46.

Figure 5A:
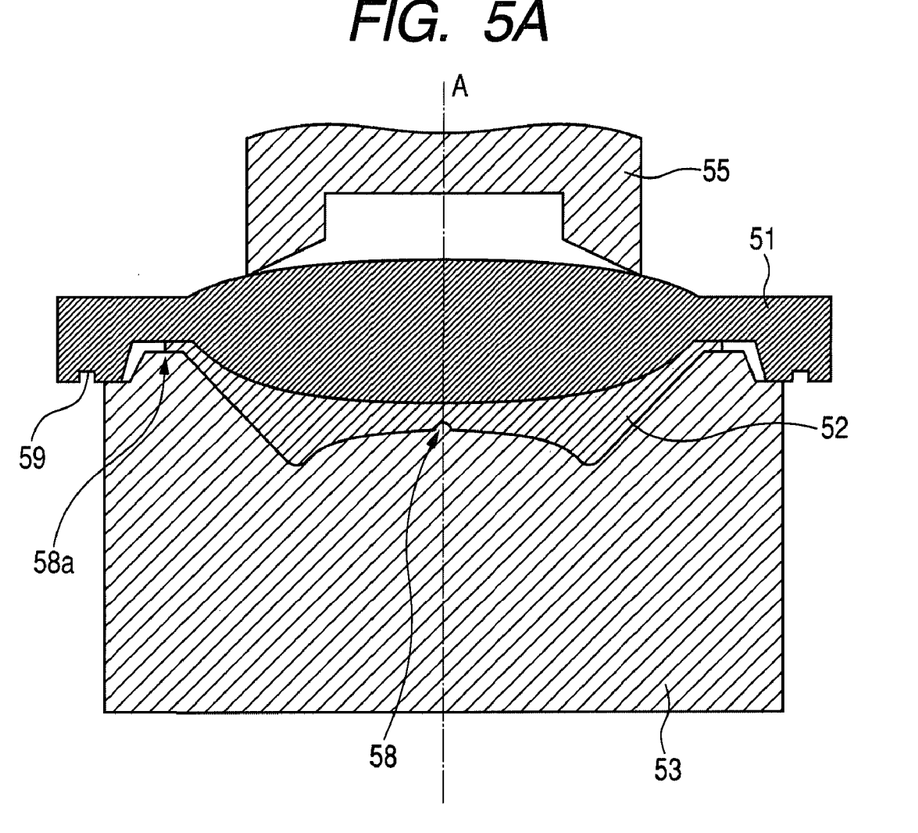
FIGS. 5A and 5B are views showing a method for producing a resin lens by use of a related-art mold.
Figure 5B:
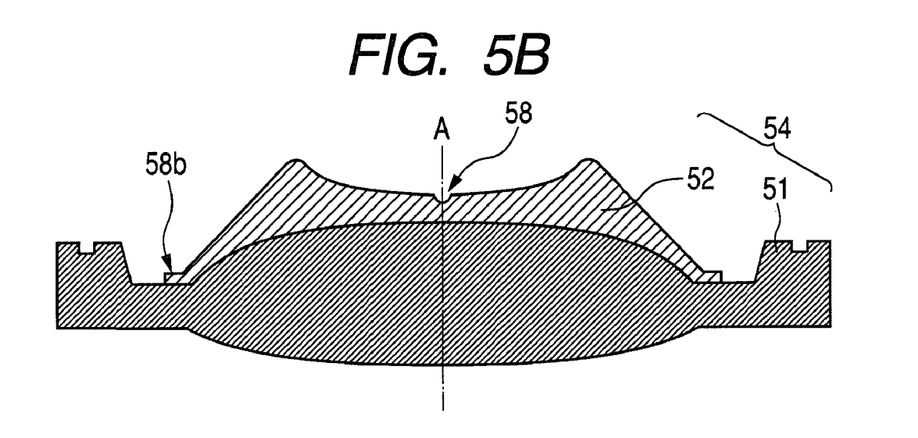

A plastic lens or a glass lens is prepared as a base lens used for manufacturing a composite lens. Next, a resin lens is produced on the base lens. However, in order to ensure optical performance of the composite lens, it is important to accurately coincide an optical axis of the base lens and an optical axis of the resin lens with each other, and it is necessary to accurately align the base lens to the mold. FIG. 5 is a view showing a method for producing a resin lens 52 by use of a related-art mold 53. FIG. 5A is a view showing a method for aligning the base lens 51 to the mold 53, and FIG. 5B is a cross-sectional view of the composite lens 54 formed by such a method. As shown in FIG. 5A, under a related-art alignment method, a base material marker 59, which is an annular recess or an annular protuberance, is first provided along an edge of the base lens, and a resin marker 58 having a curvature is formed in the center of a mold surface of the mold 53.

Subsequently, a composite lens for reference purpose is produced, and the degree of alignment between the base marker 59 and the resin marker 58 is measured by a measuring microscope, thereby measuring the degree of alignment between the optical axis of the base lens 51 and the optical axis of the resin lens 52. Next, a relative position between the mold 53 and a base material holding member 55 achieved in a horizontal direction (in a direction perpendicular to the optical axis) is adjusted so as to offset a deviation in the degree of alignment. Subsequently, a composite lens for reference purpose is again produced; the degree of alignment between the base marker 59 and the resin marker 58 of the thus-manufactured composite lens is measured; the degree of alignment between the optical axis of the base lens 51 and the optical axis of the resin lens 52 is measured; and the relative position is subsequently adjusted. When the degree of alignment falls within a desired range through repetition of such feedback operation, alignment of the mold 53 to the base material holding member 55 is completed, and mass-production of a composite lens is commenced. Moreover, even in connection with mass-produced composite lenses, the degree of alignment between the base marker 59 and the resin marker 58 is measured, and misaligned defective resin lenses are sorted out.

In the meantime, there is also a method for utilizing a contour of the base lens 51 as a marker without additional provision of the base material marker 59 during adjustment of the horizontal position of the base lens 51 and the horizontal position of the resin lens 52. The method is for measuring the degree of alignment between the contour of the base lens 51 and the resin marker 58 by means of the measuring microscope, thereby measuring the degree of alignment between the optical axis of the base lens 51 and the optical axis of the resin lens 52 and aligning the mold 53 to the base material holding member 55 on the basis of a resultant measurement value.

However, the resin marker 58 formed in the center of the mold surface used for aligning an optical axis A of the base lens 51 to the mold 53 is present within an optically effective diameter. Hence, from the viewpoint of assurance of optical performance of the composite lens 54, the resin marker 58 must be sufficiently reduced. Since the resin marker 58 has a curvature, a contrast is not clear when the marker is viewed from the direction of the optical axis A. Therefore, the resin marker 58 is not easily seen at time of alignment, which poses a problem of difficulty in measurement of the degree of alignment. There is also a method for placing an annular indentation (not shown) in a neighborhood 58a of an outer circumference of the mold surface rather than in the center of the mold surface and transferring an annular protuberance (not shown) as a resin marker to the neighborhood 58b of the outer circumference of the resin lens 52. (The method will be hereunder called "related-art example 2") However, as shown in FIG. 5A, the annular indentation formed in the neighborhood 58a of the outer circumference of the mold surface is at a positionally-elevated location in the mold 53; hence, there may be the case where the annular indentation is not sufficiently filled with resin. Insufficient charging of resin makes it difficult to produce the resin marker in a desired shape, which in turn raises a problem of a failure to use the annular protuberance as the resin marker.

Patent Document 1: JP-A-2003-25345

SUMMARY OF THE INVENTION

A challenge to be met by the present invention is to provide a highly-productive composite lens by making, during production of a resin lens, clear a resin marker formed for aligning a mold to a base lens, to thus facilitate alignment of the mold with the base lens when adjustment is performed by feeding back an amount of positional deviation between the mold and the base lens; moreover, to provide a precision composite lens exhibiting high optical performance by accurately aligning the mold to the base lens.

A composite lens of the present invention has a base lens and a resin lens provided on the base lens, and the resin lens has, in an area outside an optically effective diameter, a first surface, a second surface that is adjacent to the first surface, and a third surface that is adjacent to the second surface in a sequence from an optical axis to an outer circumference. The first surface has an inclined surface that becomes higher from the outer circumference toward the optical axis, and the inclined surface is connected to the second surface. The second surface has a plane that is substantially perpendicular to the optical axis, and the substantially perpendicular plane is connected to the first plane. The third surface has an inclined surface that becomes lower from the optical axis toward the outer circumference. In a preferred aspect of such a composite lens, a connecting portion between the first surface and the second surface has a curvature radius of 0.03 mm or less. In another aspect of the composite lens of the present invention, a composite lens has a base lens and a resin lens placed on the base lens, and the resin lens has, in an area outside an optically effective diameter, a plane that is substantially perpendicular to an optical axis and a protuberant edge that is connected to an outer circumference of the substantially-perpendicular plane and that bulges in a direction of the optical axis; and a connecting portion between the substantially perpendicular plane and the protuberant edge has a curvature radius of 0.03 mm or less. In a preferred aspect, the protuberant edge has an inner-circumference-side end and an outer-circumference-side end that is lower than the inner-circumference-side end.

Alignment of a mold to a base lens is facilitated, and a highly productive precision composite lens can be provided.

DESCRIPTION OF THE PREFERRED EMBODIMENTS

First Embodiment

Figure 1A:
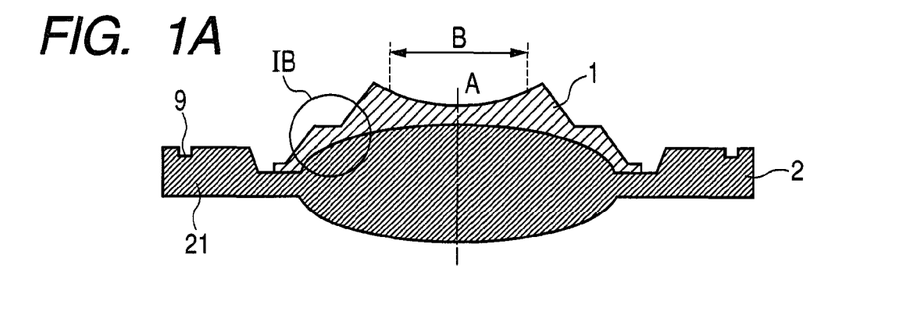
FIGS. 1A to 1D are cross-sectional views of composite lenses of first and second embodiments of the present invention.
Figure 1B:
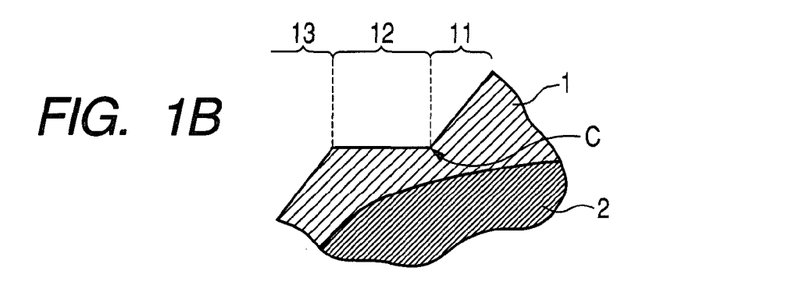

A cross-sectional view of a composite lens of a present embodiment is shown in FIGS. 1A and 1B. FIG. 1B is an enlarged view of a portion IB shown in FIG. 1A. As shown in FIG. 1A, the composite lens has a base lens 2 and a resin lens 1 provided on the base lens 2. As shown in FIG. 1B, the resin lens 1 has, in an area outside an optically effective diameter B, a first surface 11, a second surface 12 that is adjacent to the first surface 11, and a third surface 13 that is adjacent to the second surface 12 in a sequence from an optical axis A to the outer circumference. The first surface 11 has an inclined surface that becomes higher from the outer circumference toward the optical axis A, and the inclined surface is coupled to the second surface. The second surface 12 is formed from a plane that is essentially perpendicular to the optical axis A, and the vertical plane is coupled to the first surface. In the meantime, the third surface 13 has an inclined surface that becomes lower from an inner circumference toward the outer circumference.

Figure 7:
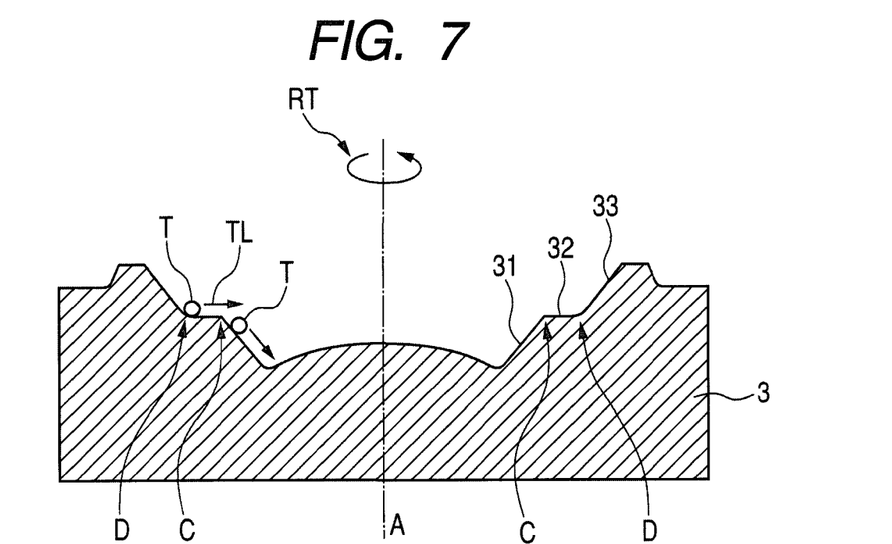
FIG. 7 is a cross-sectional view of a mold used for manufacturing the composite lens of the first embodiment.

The first surface 11 has an inclined surface coupled to the second surface 12, and the second surface 12 is a plane that is substantially perpendicular to the optical axis A and that is connected to the first surface. FIG. 7 shows a cross-section of a mold 3 used for manufacturing the composite lens of the present embodiment. In FIG. 7, a mold surface 31 transfers the first surface, and a mold surface 32 transfers the second surface. Further, a mold surface 33 transfers the third surface. When the mold surfaces 31, 32, and 33 of the mold 3 are produced, the mold 3 is rotated in the direction of arrow RT around the optical axis A, and a cutting tool is moved in the direction of arrow TL. A circle T in FIG. 7 is a circle that represents a curvature radius of a cutting edge of the cutting tool. Since a connecting portion C between the mold surface 31 and the mold surface 32 assumes a convex shape. Hence, the curvature radius of the connecting portion C can be made equal to or smaller than the curvature radius of the cutting tool, so that the connecting portion C can be formed into a sharp edge to a desired extent. In the meantime, since; for instance, a connecting portion D between the mold surface 32 and the mold surface 33 assumes a concave shape, the curvature radius of the connecting portion D cannot be made less than the curvature radius of the cutting tool, so that the connecting portion D cannot be formed into a sharp edge to a desired extent.

A sharp edge can be created in the connecting portion C between the first surface 11 and the second surface 12 by using such a mold, and connecting portion can be formed with a stair-shaped step. Since the manufactured composite lens has a sharp edge formed on the resin lens, the connecting portion C can be effectively utilized as a resin marker for aligning the composite lens. Molds for second and third embodiments can also be manufactured under a similar method.

Further, since a related-art resin marker for alignment purpose is formed in the center of a mold surface and falls within an optically effective radius, the resin marker must be made sufficiently small from the viewpoint of assurance of optical performance. In contrast, in the composite lens of the present invention, since the connecting portion C serving as a resin marker is present outside the optically effective radius, the connecting portion can be made sufficiently large, and the identification performance of the resin marker can be enhanced. From the viewpoint of contrast of the resin marker being made clearer, the curvature radius of the connecting portion C is preferably 0.03 mm or less; more preferably 0.01 mm or less; and particularly preferably 0.005 mm or less. From view point of enhancement of the ease of identification of the connecting portion C, which serves as a resin marker, between the first surface 11 and the second surface 12 achieved when the connecting portion is viewed from the direction of the optical axis A during alignment of the base lens to the mold, the second surface 12 preferably falls within a range of 90°±5° and, more preferably, within a range of 90°±1° with respect to the optical axis A.

Figure 2A:
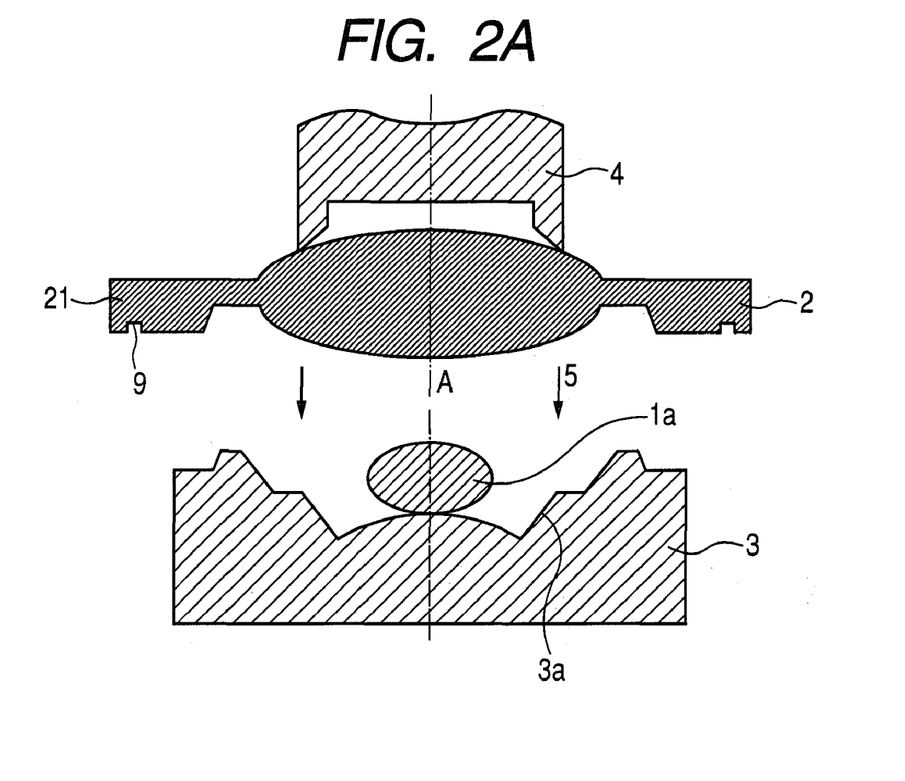
FIGS. 2A and 2B are views showing a method for manufacturing the composite lens of the first embodiment.

FIG. 2 shows a method for manufacturing the composite lens of the present embodiment. First, as shown in FIG. 2A, the base lens 2 is placed on a base material holding member 4. The base lens 2 is sandwiched between the base material holding member 4 and the mold 3, and the base lens 2 is aligned by means of a bell clamp method, and the like. For instance, a member having a cavity therein and a structure for holding the base lens 2 by suction when connected to an un-illustrated vacuum exhaust system is used for the base material holding member 4. In addition, a member having a structure that mechanically pinches and holds the base lens 2 can also be used for the base material holding member 4.

Figure 2B:
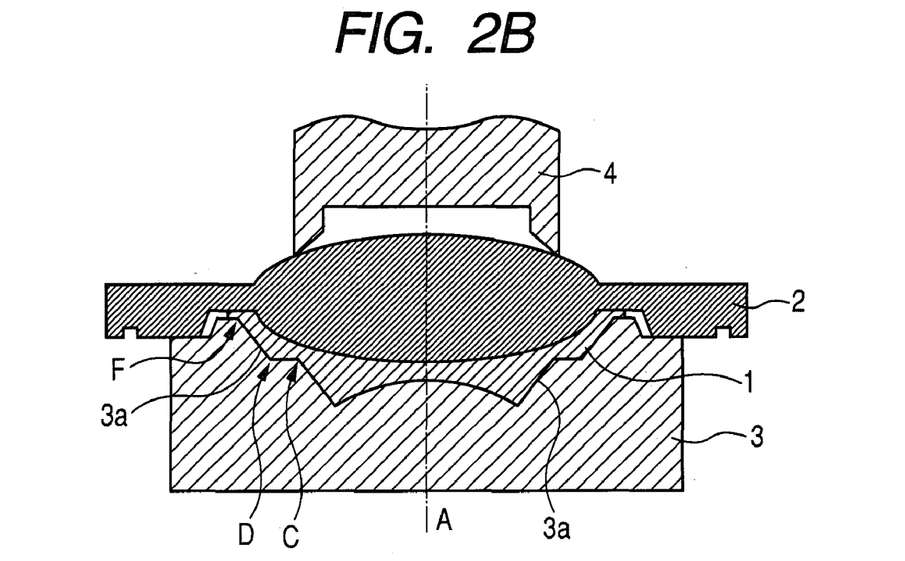

A plastic lens formed from ZEONEX (registered trademark) manufactured by ZEON corporation or TOPAS (registered trademark) manufactured by POLYPLASTIC corporation is preferable for the base lens. Resin 1a placed on the mold surface 3a of the mold 3 is an UV curable resin or a thermosetting resin. In the case of a UV curable resin, fluoren-based acrylate, and the like, is preferable. A mold made of metal or quartz is used for the mold 3. When a mold made of quartz is used, a resin can be exposed to UV radiation through the mold 3, to thus be cured, at the time of curing of a UV curable resin. When a mold made of metal is used, resin is exposed to UV radiation through; for instance, a cavity of the base material holding member 4 that holds the base lens 2. When the base material holding member 4 is lowered in a direction of arrow 5, the base lens 2 contacts a resin as shown in FIG. 2B, whereupon the resin spreads over the surface of the base lens 2 and is charged along the geometry of the mold surface 3a of the mold 3.

As shown in FIG. 1B, the third surface 13 of the resin lens has an inclined surface that becomes lower from the inner circumference to the outer circumference. As shown in FIG. 2B, the geometry of the third surface is based on the fact that the shape of the mold surface 3a of the mold 3 has an elevation from a position D corresponding to the inner circumference of the third surface toward a position F corresponding to the outer circumference of the third surface. Therefore, the connecting portion C acting as a resin marker is located in the center compared to the position D and the position F and at a position lower than the position F; hence, the connecting portion C is placed at a position where an abundant resin is available. Therefore, the resin lens can be produced in such a way that the third surface is created, whereby a resin marker can be produced without fail in contrast with the second related-art example. Subsequently, the UV curable resin is exposed to UV radiation, and the thermosetting resin is set by heating, to thus produce the resin lens 1 on the base lens 2. A method for pressing and molding a resin while curing the resin by UV radiation or heating as well as a method for curing the resin 1a after pressing of the resin on the mold 3 are effective for molding and curing a resin. In the case of a resin exhibiting great contraction during curing operation, there may be a case where a resin is cured while deviating from the shape of the mold surface 3a of the mold 3 because of contraction of a resin. In such a case, a resin is pressed and molded while cured, whereby the resin lens 1 faithfully complying with the shape of the mold surface 3a can be produced.

A method for aligning a base lens to a mold will be described hereunder. As shown in FIG. 2A, the base material marker 9, which is an annular indentation or an annular protuberance, is provided on the edge 21 of the base lens 2. Next, the composite lens for reference purpose is produced, and the degree of alignment between the base material marker and the resin marker is measured by use of a measuring microscope, thereby measuring the degree of alignment between the optical axis of the base lens 2 and the optical axis of the resin lens 1. Subsequently, a relative position between the mold 3 and the base material holding member 4 achieved in the horizontal direction (the direction perpendicular to the optical axis A) is adjusted so as to offset a deviation in the degree of alignment. In a resin lens produced in the present embodiment, the first surface has an inclined plane coupled to the second surface, and the second surface of a plane is substantially perpendicular to the optical axis A. The connecting portion C between the first surface and the second surface forms a sharp edge and has a stair-shaped step. Hence, the connecting portion C functions as a resin marker exhibiting clear contrast, thereby enabling easy measurement of the degree of alignment between the resin marker and the base material marker. Thus, high productivity is achieved.

Next, a composite lens for reference purpose is again produced, and the degree of alignment between the base material marker 9 of the produced composite lens and the resin marker is measured; the degree of alignment between the optical axis of the base lens 2 and the optical axis of the resin lens 1 is measured; and subsequently the relative position is adjusted. When the degree of alignment falls within a desired range as a result of repetition of such feedback operation, alignment of the mold 3 to the base material holding member 4 is completed, and mass-production of the composite lens is initiated. Further, in relation to mass-produced composite lenses, misaligned defective resin lenses can be inspected and sorted out by measuring the degree of alignment between the base material marker and the resin marker. However, inspection of a faulty, such as misalignment, becomes easier than related-art inspection, and occurrence of misalignment can be diminished.

In the meantime, the base material marker 9 is not additionally provided, and the contour of the base lens 2 can also be utilized as a marker during adjustment of the horizontal position of the base lens 2 and the horizontal position of the resin lens 1. The degree of alignment between the optical axis of the base lens 2 and the optical axis of the resin lens 1 is measured by measuring the degree of alignment between the contour of the base lens and the resin marker by use of a measuring microscope, and the mold 3 and the base material holding member 4 can be aligned together on the basis of a measurement value.

Second Embodiment

Figure 1C:
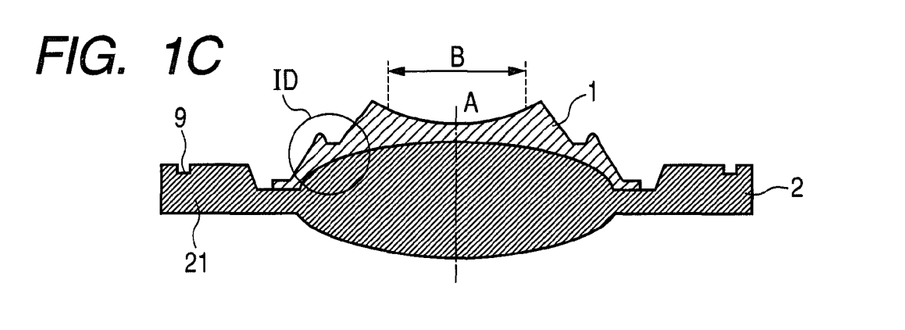
Figure 1D:
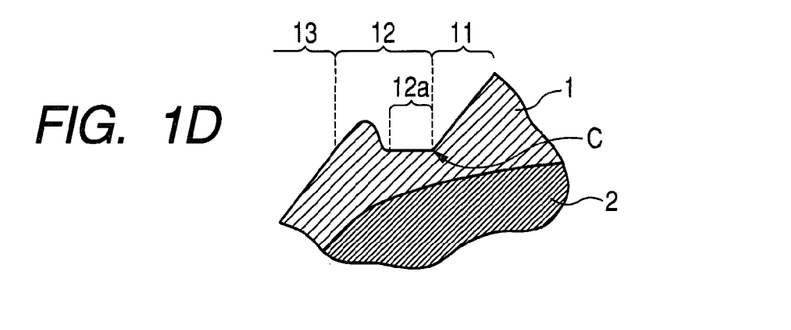

A cross-sectional view of a composite lens of the present embodiment is shown in FIGS. 1C and 1D. FIG. 1D is an enlarged view of a portion ID in FIG. 1C. As shown in FIG. 1C, the composite lens has the base lens 2 and the resin lens 1 provided on the base lens 2. As shown in FIG. 1D, the resin lens 1 has, in the area outside the optically effective diameter B, the first surface 11, the second surface 12 that is adjacent to the first surface 11, and the third surface 13 that is adjacent to the second surface 12 in a sequence from the optical axis A to the outer circumference. The first surface 11 has an inclined plane that becomes higher from the outer circumference toward the optical axis A, and the inclined surface is connected to the second surface. The second surface 12 has a plane 12 that is essentially perpendicular to the optical axis A, and the plane 12a is coupled to the first surface 11. In the meantime, the third surface 13 has an inclined surface that becomes lower from an inner circumference toward the outer circumference.

The first surface 11 has an inclined surface coupled to the second surface 12, and the second surface 12 has a plane 12a that is substantially perpendicular to the optical axis A and that is coupled to the first surface 11. Consequently, the connecting portion C between the first surface 11 and the second surface 12 forms a sharp edge and has a stair-shaped step. As shown in FIG. 1C, the base material marker 9, which is an annular indentation or an annular protuberance, is provided in the edge 21 of the base lens 2. Even the composite lens of the second embodiment yields the effect of the composite lens of the first embodiment. It is desirable that the method for manufacturing a composite lens of the present embodiment be made identical with the method for manufacturing the composite lens of the first embodiment and that the curvature radius of the connecting portion C and an angle which the plane 12a forms with the optical axis A be also made identical with those of the first embodiment.

Third Embodiment

Figure 6A:
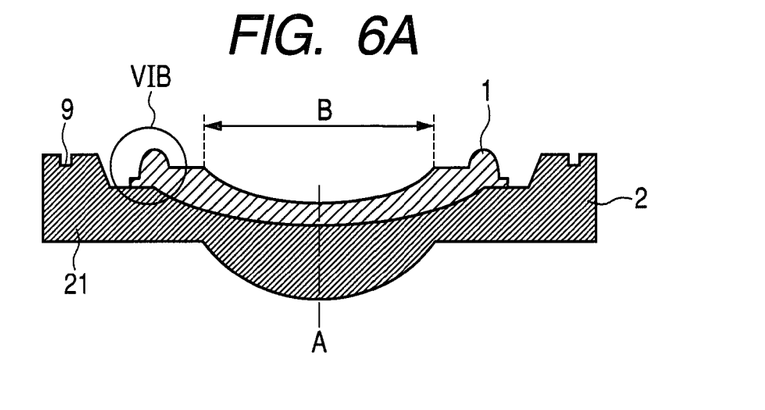
FIGS. 6A and 6B are cross-sectional views of the composite lens of the third embodiment.
Figure 6B:
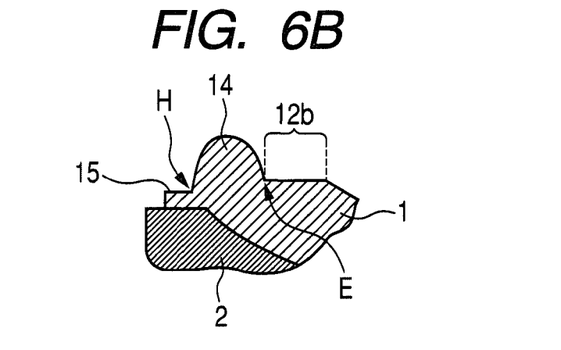

A cross-sectional view of a composite lens of the present embodiment is shown in FIGS. 6A and 6B. FIG. 6B is an enlarged view of a VIB in FIG. 6A. As shown in FIG. 6A, the composite lens has the base lens 2 and the resin lens 1 placed on the base lens 2. As shown in FIG. 6B, the resin lens 1 has, in an area outside an optically effective diameter B, a plane 12b that is substantially perpendicular to the optical axis A and a protuberance edge 14 that is connected to the outer circumference of the plane 12b and that bulges in the direction of the optical axis A. A connecting portion E between the plane 12b and the protuberant edge 14 has a curvature radius of 0.03 mm or less. Therefore, the connecting portion E between the plane 12b and the protuberant edge 14 forms a sharp edge. Further, the base material marker 9, which is an annular indentation or an annular protuberance, is provided on the edge 21 of the base lens 2. Since a composite lens to be manufactured also has the connecting portion E with a sharp edge on the resin lens, the connecting portion E can be effectively utilized as a resin marker for aligning the composite lens.

Since the related-art resin marker for alignment purpose is formed in the center of a mold surface and falls within an optically effective radius, the resin marker must be made sufficiently small from the viewpoint of assurance of optical performance. In contrast, in the composite lens of the present invention, since the connecting portion E serving as a resin marker is present outside the optically effective radius B, a sufficient size can be ensured, and the identification performance of the resin marker can be enhanced. From the viewpoint of contrast of the resin marker being made clearer, the curvature radius of the connecting portion E is preferably 0.03 mm or less; more preferably 0.01 mm or less; and particularly preferably 0.005 mm or less. From the viewpoint of enhancement of the ease of identification of the connecting portion E, which serves as a resin marker, between the plane 12b and the protuberant edge 14 achieved when the connecting portion is viewed from the direction of the optical axis A during alignment of the base lens to the mold, the plane 12b preferably falls within a range of 90°±5° and, more preferably, within a range of 90°±1° with respect to the optical axis A.

Figure 3A:
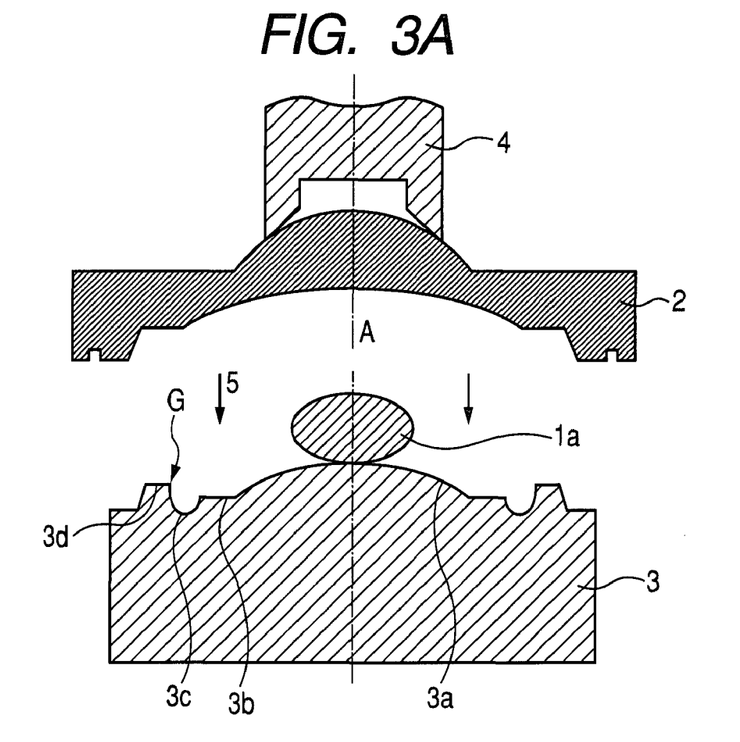
FIGS. 3A and 3B are views showing a method for manufacturing a composite lens of a third embodiment of the present invention.

FIG. 3 shows a method for manufacturing the composite lens of the present embodiment. First, as shown in FIG. 3A, the base lens 2 is placed on a base material holding member 4. The base lens 2 is aligned by means of a bell clamp method, and the like. For instance, a member having a cavity therein and a structure for holding the base lens 2 by suction is used for the base material holding member 4. In addition, a member having a structure that mechanically pinches and holds the base lens 2 can also be used for the base material holding member 4. A plastic lens formed from ZEONEX (registered trademark) manufactured by ZEON corporation or TOPAS (registered trademark) manufactured by POLYPLASTICS corporation can be preferably used for the base lens. An UV curable resin or a thermosetting resin is used for the resin 1a to be placed on the mold surface 3a of the mold 3. For instance, a UV curable resin, such as fluoren-based acrylate, is used. A mold made of metal or quartz is used for the mold 3.

Figure 3B:
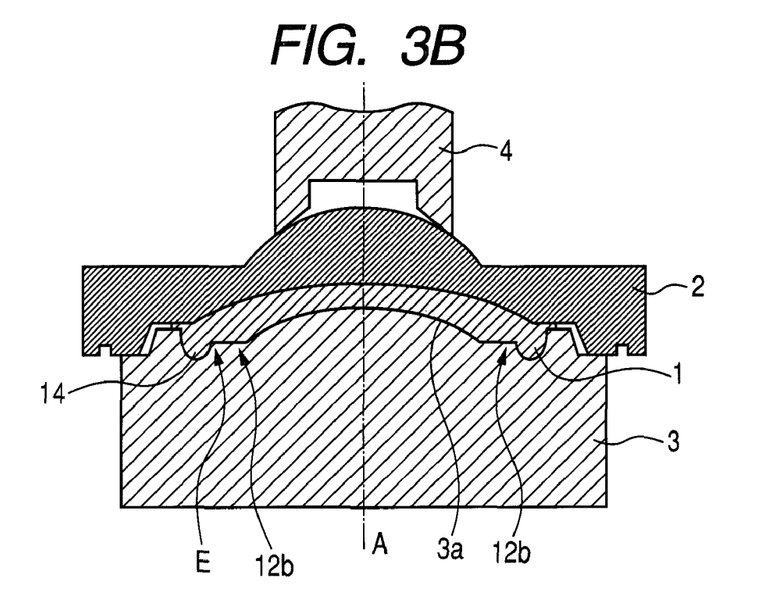
Figure 4A:
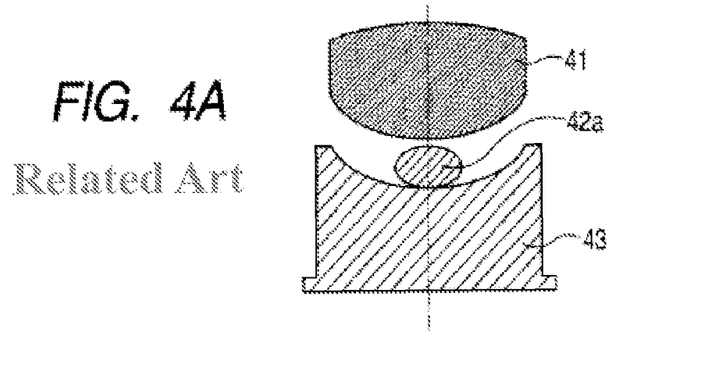
FIGS. 4A to 4D are views showing a method for manufacturing a related-art composite lens.
Figure 4B:
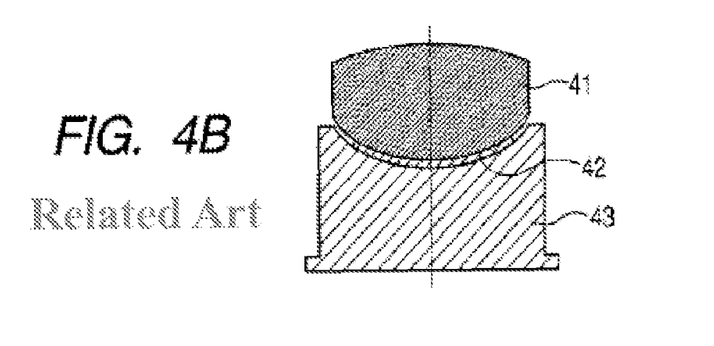
Figure 4C:
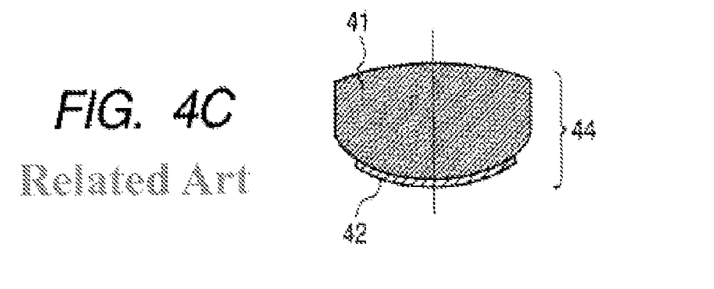
Figure 4D:
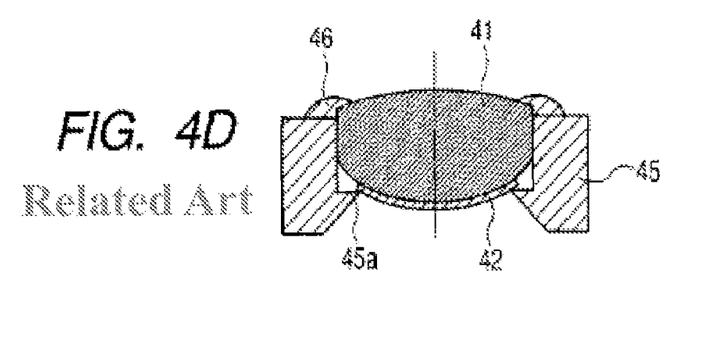

When the base material holding member 4 is lowered in the direction of arrow 5, the base lens 2 contacts the resin as shown in FIG. 3B. The resin spreads over the surface of the base lens 2 and charged along the geometry of the mold surface 3a of the mold 3. As shown in FIG. 6B, the resin lens has the protuberant edge 14 along the outer circumference of the plane 12b that is substantially perpendicular to the optical axis A. As shown in FIG. 3B, the geometry of the resin lens is determined by a resin pool that is present along the outer circumference of the position corresponding to the connecting portion E around the mold surface 3a of the mold 3.

Specifically, as shown in FIG. 3A, the mold 3 has a mold surface 3b corresponding to the plane 12b of the resin lens. Further, the mold 3 has a mold surface 3c corresponding to the protuberant edge 14 of the resin lens. The mold 3 also has a mold surface 3d coupled to the mold surface 3c toward the outer circumference. In the mold 3, the mold surface 3b is located at a position that is lower than the surface 3d. Therefore, as shown in FIG. 3B, difficulty is encountered in stably feeding the resin, which is extruded from the center toward the outer circumference, to the mold surface 3d located at a higher position by way of a gap between the mold 3 and the base lens 2. However, the resin can be sufficiently, stably supplied to the mold surface 3b that is located at a lower position. For these reasons, a resin marker can be created without fail in the connecting portion E between the plane 12b and the protuberant edge 14. As shown in FIG. 3A, a connecting portion G between the mold surface 3c and the mold surface 3d is situated at a position higher than the mold surface 3b. Consequently, as shown in FIG. 6B, in the resin lens 1, a point of intersection between the protuberant edge 14 and the surface 15 connected to the protuberant edge 14; namely, an outer-circumference-side rim H of the protuberant edge 14 is created at a position that is lower than the inner-circumference-side rim E of the protuberant edge 14.

Subsequently, the resin is cured, thereby producing the resin lens 1 on the base lens 2. In relation to molding and curing of resin, a method for pressing and molding the resin 1a on the mold 3 and subsequently curing the resin can be adopted. Further, a method for pressing and molding a resin while simultaneously curing the resin is also effective. In the resin lens to be produced in the present embodiment, the plane 12b is substantially perpendicular to the optical axis A, and a curvature radius of the connecting portion between the plane 12b and the protuberant edge 14 is 0.03 mm or less. Consequently, since the connecting portion E between the plane 12b and the protuberant edge 14 forms a sharp edge, the connecting portion E can act as a resin marker with clear contrast. In other respects; for instance, a working-effect, the present embodiment is identical with the first embodiment. In the present patent application, a biconvex lens and a meniscus lens have been described as the embodiments. However, they are merely illustrative, and the present invention is not limited to them and can also be effectively applied to a biconcave lens, a plane-convex lens, and a plane-concave lens.

Accurate alignment of a mold to a base lens is facilitated, and high-precision optical equipment with high optical performance can be provided.

What is claimed is:
1. A composite lens, comprising:
    a base lens; and
    a resin lens, provided on the base lens, and having, in an area outside an optically effective diameter and on a surface of the resin lens that is opposite to a surface of the resin lens at a side of the base lens, a first surface and a second surface that is adjacent to the first surface and a third surface that is adjacent to the second surface in a sequence from an optical axis of the base lens toward an outer circumference of the resin lens, the resin lens being joined to the base lens without forming a closed space between the base lens and the resin lens;

wherein the first surface has an inclined surface that becomes higher from the outer circumference toward the optical axis and that is connected to the second surface;

the second surface has a plane that is substantially perpendicular to the optical axis and that is connected to the inclined surface; and the third surface has an inclined surface that becomes lower from the inner circumference toward the outer circumference.

2. The composite lens according to claim 1, wherein a connecting portion between the first surface and the second surface has a curvature radius of 0.03 mm or less.

* * * * *